US011010637B2

United States Patent
Visentini Scarzanella et al.

(10) Patent No.: US 11,010,637 B2
(45) Date of Patent: May 18, 2021

(54) GENERATIVE ADVERSARIAL NETWORK EMPLOYED FOR DECENTRALIZED AND CONFIDENTIAL AI TRAINING

(71) Applicant: INTERNATIONAL BUSINESS MACHINES CORPORATION, Armonk, NY (US)

(72) Inventors: Marco Visentini Scarzanella, Tokyo (JP); Phongtharin Vinayavekhin, Tokyo (JP); Jayakorn Vongkulbhisal, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 224 days.

(21) Appl. No.: 16/238,897

(22) Filed: Jan. 3, 2019

(65) Prior Publication Data
US 2020/0218937 A1    Jul. 9, 2020

(51) Int. Cl.
*G06K 9/62* (2006.01)
*G06N 3/08* (2006.01)

(52) U.S. Cl.
CPC ........... *G06K 9/6256* (2013.01); *G06K 9/628* (2013.01); *G06N 3/088* (2013.01)

(58) Field of Classification Search
CPC .............................. G06K 9/6256; G06K 9/628
See application file for complete search history.

(56) References Cited

U.S. PATENT DOCUMENTS

| 2011/0320767 A1 | 12/2011 | Eren et al. |
| 2016/0019469 A1 | 1/2016 | Petrov |
| 2017/0193400 A1 | 7/2017 | Bhaskar et al. |
| 2019/0034581 A1* | 1/2019 | Aliper ..................... G16B 5/00 |
| 2019/0122072 A1* | 4/2019 | Cricr .................... G06K 9/6277 |

FOREIGN PATENT DOCUMENTS

WO    2015103514 A1    7/2015

OTHER PUBLICATIONS

Chen et al., "InfoGAN: Interpretable Representation Learning by Information Maximizing Generative Adversarial Nets", Advances in Neural Information Processing System (NIPS). arXiv preprint arXiv:1606.03657. Jun. 12, 2016. pp. 2172-2180.

(Continued)

*Primary Examiner* — Tuan H Nguyen
(74) *Attorney, Agent, or Firm* — Tutunjian & Bitetto, P.C.; Randall Bluestone

(57) ABSTRACT

A computer-implemented method is presented for constructing a trained model for a plurality of edge classifiers in a network having a federated classifier, a generator, and a discriminator. The method includes obtaining edge trained models from the plurality of edge devices, each edge trained model being trained independently with data from private data of each edge, training the generator model and discriminator model by employing the edge trained models and an unlabeled set of data by employing a generative adversarial training procedure, generating data samples by the trained generator model, training the federated classifier with the data samples from the generator model, and deploying the trained model back to the plurality of edge devices.

18 Claims, 8 Drawing Sheets

(56) References Cited

OTHER PUBLICATIONS

Goodfellow et al., "Generative Adversarial Nets", Advances in Neural Information Processing Systems (NIPS). arXiv: 1406.2661v1. 2014. pp. 2672-2680.
McMahan et al., "Federated Learning: Collaborative Machine Learning without Centralized Training Data", Google AI Blog. https://ai.googleblog.com/2017/04/federated-learning-collaborative.html. Apr. 6, 2017. pp. 1-8.
Odena et al., "Conditional Image Synthesis with Auxiliary Classifier GANs", Proceedings of the 34 th International Conference on Machine Learning 2017. arXiv:1610.09585v3 [stat.ML]. Jan. 1, 2017. pp. 1-16.

\* cited by examiner

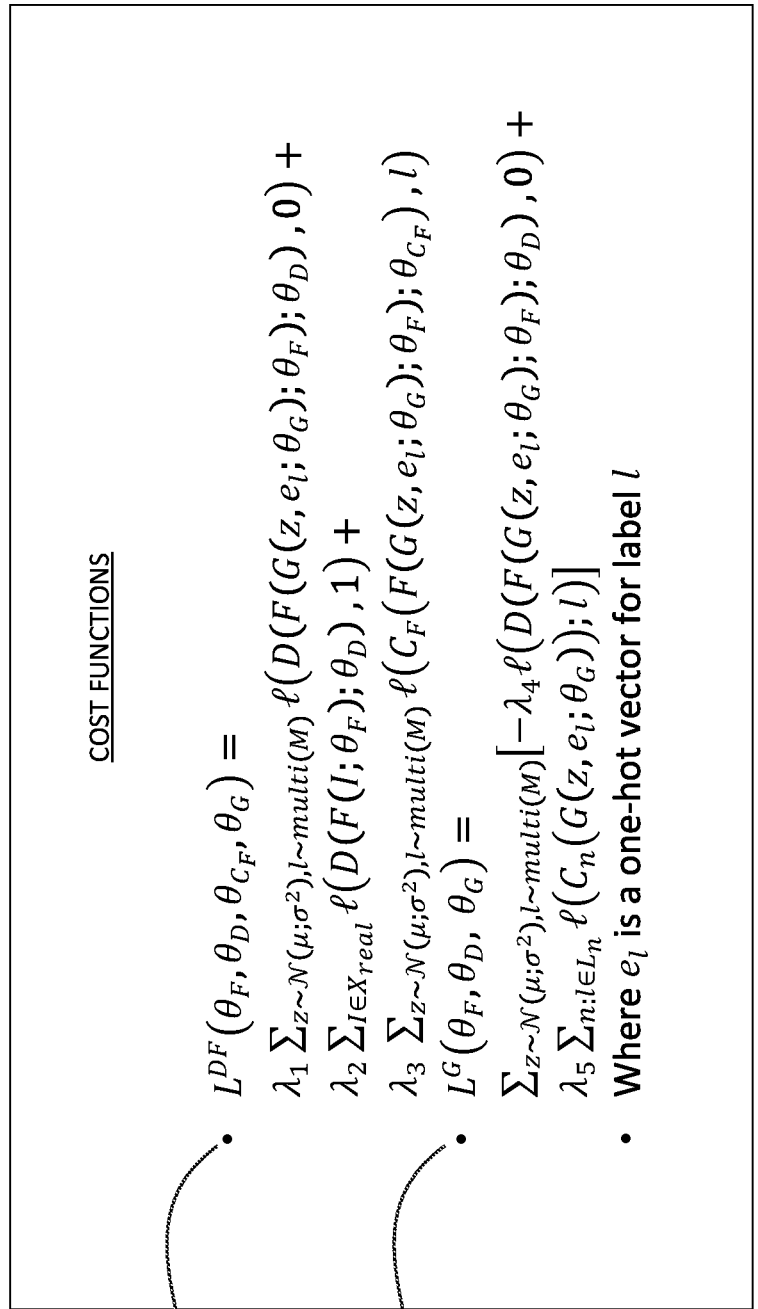

FIG. 8

COST FUNCTIONS

- $L^{DF}(\theta_F, \theta_D, \theta_{C_F}, \theta_G) =$
  $\lambda_1 \sum_{z \sim \mathcal{N}(\mu;\sigma^2), l \sim multi(M)} \ell\big(D(F(G(z, e_l; \theta_G); \theta_F); \theta_D), 0\big) +$
  $\lambda_2 \sum_{I \in X_{real}} \ell\big(D(F(I; \theta_F); \theta_D), 1\big) +$
  $\lambda_3 \sum_{z \sim \mathcal{N}(\mu;\sigma^2), l \sim multi(M)} \ell\big(C_F(F(G(z, e_l; \theta_G); \theta_F); \theta_{C_F}), l\big)$

- $L^G(\theta_F, \theta_D, \theta_G) =$
  $\sum_{z \sim \mathcal{N}(\mu;\sigma^2), l \sim multi(M)} \big[-\lambda_4 \ell\big(D(F(G(z, e_l; \theta_G); \theta_F); \theta_D), 0\big) +$
  $\lambda_5 \sum_{n: l \in L_n} \ell\big(C_n(G(z, e_l; \theta_G)); l\big)\big]$

- Where $e_l$ is a one-hot vector for label $l$

810

820

GENERATIVE ADVERSARIAL NETWORK EMPLOYED FOR DECENTRALIZED AND CONFIDENTIAL AI TRAINING

BACKGROUND

Technical Field

The present invention relates generally to artificial intelligence training, and more specifically, to a generative adversarial network employed for decentralized and confidential artificial intelligence training.

Description of the Related Art

Edge-based applications require an increasingly personalized experience based on user-collected data. This results in two conflicting goals. The first is to maximize network performance by training a decentralized model which incorporates all the information from different users collected at the edge. The second is to preserve the users' privacy and device power/bandwidth by not sending user-collected data (e.g., images) to the cloud. The standard approach in an artificial intelligence (AI) model training is based on two paradigms. The first is that a large central database of generic data can be used to train deep neural networks. The trained networks are then deployed to the edge for inference. User specificity is not preserved since the model is trained with generic data. The second is that data is sent from the edge to a central server. A model is trained using all the collected user data. User privacy, however, is not preserved.

SUMMARY

In accordance with an embodiment, a method is provided for constructing a trained model for a plurality of edge classifiers in a network having a federated classifier, a generator, and a discriminator. The method includes obtaining edge trained models from the plurality of edge devices, each edge trained model being trained independently with data from private data of each edge, training the generator model and discriminator model by employing the edge trained models and an unlabeled set of data by employing a generative adversarial training procedure, generating data samples by the trained generator model, training the federated classifier with the data samples from the generator model, and deploying the trained model back to the plurality of edge devices.

In accordance with another embodiment, a system is provided for constructing a trained model. The system includes a plurality of edge devices in a network having a federated classifier, a generator model, and a discriminator model configured to obtain edge trained models from the plurality of edge devices, each edge trained model being trained independently with data from private data of each edge, train the generator model and discriminator model by employing the edge trained models and an unlabeled set of data by employing a generative adversarial training procedure, generate data samples by the trained generator model, train the federated classifier with the data samples from the generator model, and deploy the trained model back to the plurality of edge devices.

In accordance with yet another embodiment, a non-transitory computer-readable storage medium comprising a computer-readable program for constructing a trained model for a plurality of edge classifiers in a network having a federated classifier, a generator, and a discriminator is presented. The non-transitory computer-readable storage medium performs the steps of obtaining edge trained models from the plurality of edge devices, each edge trained model being trained independently with data from private data of each edge, training the generator model and discriminator model by employing the edge trained models and an unlabeled set of data by employing a generative adversarial training procedure, generating data samples by the trained generator model, train the federated classifier with the data samples from the generator model, and deploying the trained model back to the plurality of edge devices.

It should be noted that the exemplary embodiments are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be described within this document.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The invention will provide details in the following description of preferred embodiments with reference to the following figures wherein:

FIG. 8 is a block/flow diagram illustrating example cost functions to train a generator model, in accordance with an embodiment of the present invention.

Throughout the drawings, same or similar reference numerals represent the same or similar elements.

DETAILED DESCRIPTION

Embodiments in accordance with the present invention provide methods and devices for constructing a trained model for a plurality of edge classifiers in a network having a federated classifier, a generator model, and a discriminator model.

Traditional enterprise software application hosting has relied on datacenter or "cloud" infrastructure to exploit economies of scale and system efficiencies. However, these datacenters can be arbitrarily distant from the points of physical operations (e.g., factories, warehouses, retail stores, and others), where the enterprise conducts most of its business operations. The industrial Internet of things (IIoT) refers to a collection of devices or use-cases that relies on instrumentation of the physical operations with sensors that track events with very high frequency.

Industrial machines in many sectors come under the Internet of things (IoT) including manufacturing, oil and gas, mining, transportation, power and water, renewable energy, heath care, retail, smart buildings, smart cities, and connected vehicles. Despite the success of cloud computing, there are a number of shortcomings. For example, it is not practical to send all of that data to cloud storage because connectivity may not always be there, bandwidth is not sufficient, or it is cost prohibitive even if the bandwidth exists. Even if connectivity, bandwidth, and cost are not issues, there is no real-time decision making and predictive maintenance that can result in significant damage to the machines. Therefore, improved computing systems, architectures, and techniques including improved edge analytics are needed to handle the large amounts of data generated by industrial machines.

Embodiments in accordance with the present invention provide methods and devices for handling large amounts of data collected by edge devices from a plurality of IoT devices. The large amounts of data are handled by employing a generative-adversarial-based cost function which uses supervision from pre-trained classifiers to train a generator model. The generator model, together with a random probability vector over all target classes is then used to generate sample data to train the desired federated classifier.

It is to be understood that the present invention will be described in terms of a given illustrative architecture; however, other architectures, structures, substrate materials and process features and steps/blocks can be varied within the scope of the present invention. It should be noted that certain features cannot be shown in all figures for the sake of clarity. This is not intended to be interpreted as a limitation of any particular embodiment, or illustration, or scope of the claims.

Figure 1:
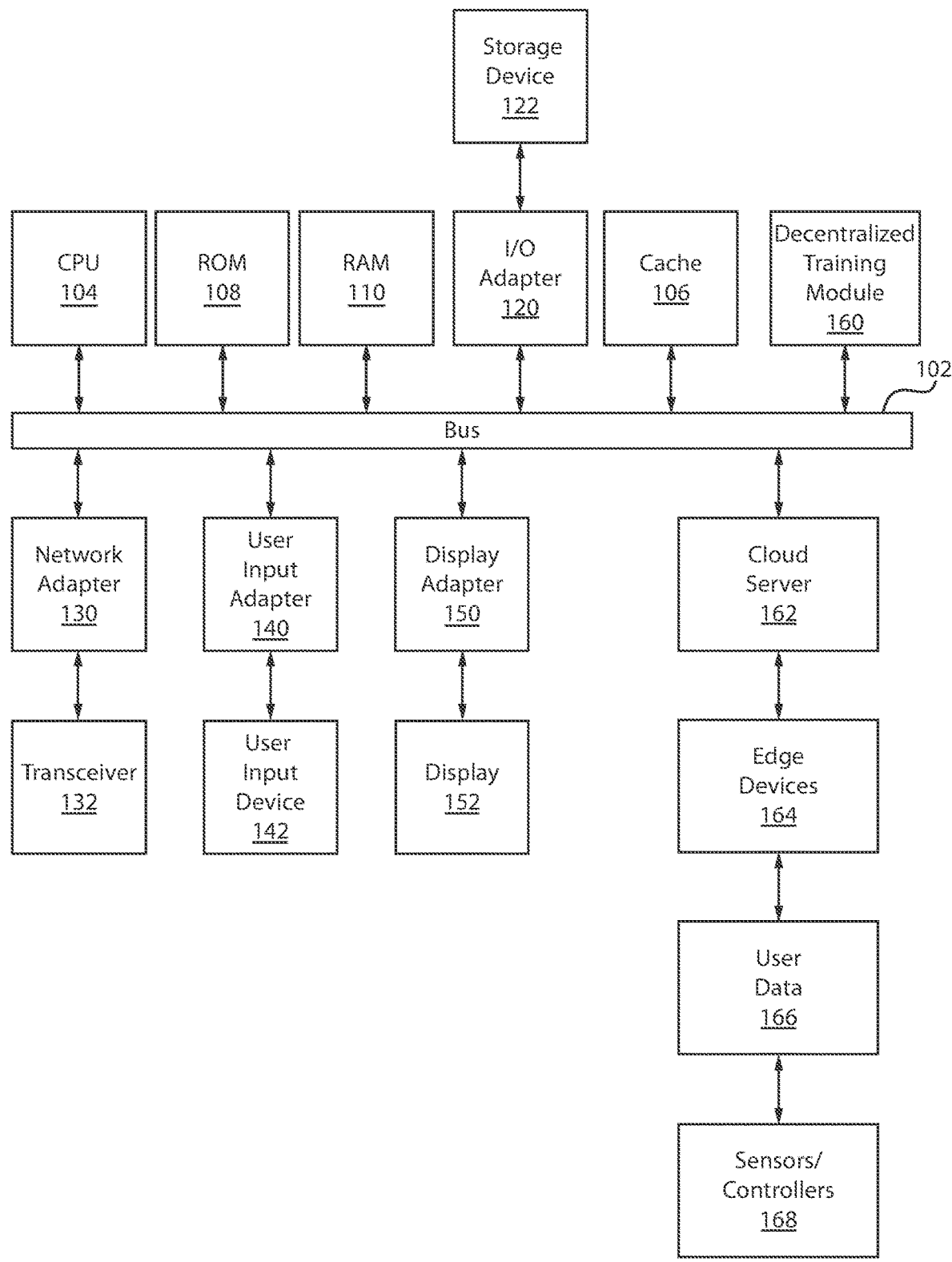
FIG. 1 is an exemplary processing system including a decentralized training module, in accordance with embodiments of the present invention.

FIG. 1 is an exemplary processing system including a decentralized training module, in accordance with embodiments of the present invention.

The processing system includes at least one processor (CPU) 104 operatively coupled to other components via a system bus 102. A cache 106, a Read Only Memory (ROM) 108, a Random Access Memory (RAM) 110, an input/output (I/O) adapter 120, a network adapter 130, a user interface adapter 140, and a display adapter 150, are operatively coupled to the system bus 102. Additionally, a decentralized training module 160 can communicate through the system bus 102. Moreover, a cloud server 162 can be connected to the system bus 102. The cloud server 162 collects user data 166 from edge devices 164. The user data 166 can be collected from a plurality of different sensors and controllers 168 (hardware components).

A storage device 122 is operatively coupled to system bus 102 by the I/O adapter 120. The storage device 122 can be any of a disk storage device (e.g., a magnetic or optical disk storage device), a solid state magnetic device, and so forth.

A transceiver 132 is operatively coupled to system bus 102 by network adapter 130.

User input devices 142 are operatively coupled to system bus 102 by user interface adapter 140. The user input devices 142 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 142 can be the same type of user input device or different types of user input devices. The user input devices 142 are used to input and output information to and from the processing system.

A display device 152 is operatively coupled to system bus 102 by display adapter 150.

Of course, the processing system can also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system are readily contemplated by one of ordinary skill in the art given the teachings of the present invention provided herein.

Figure 2:
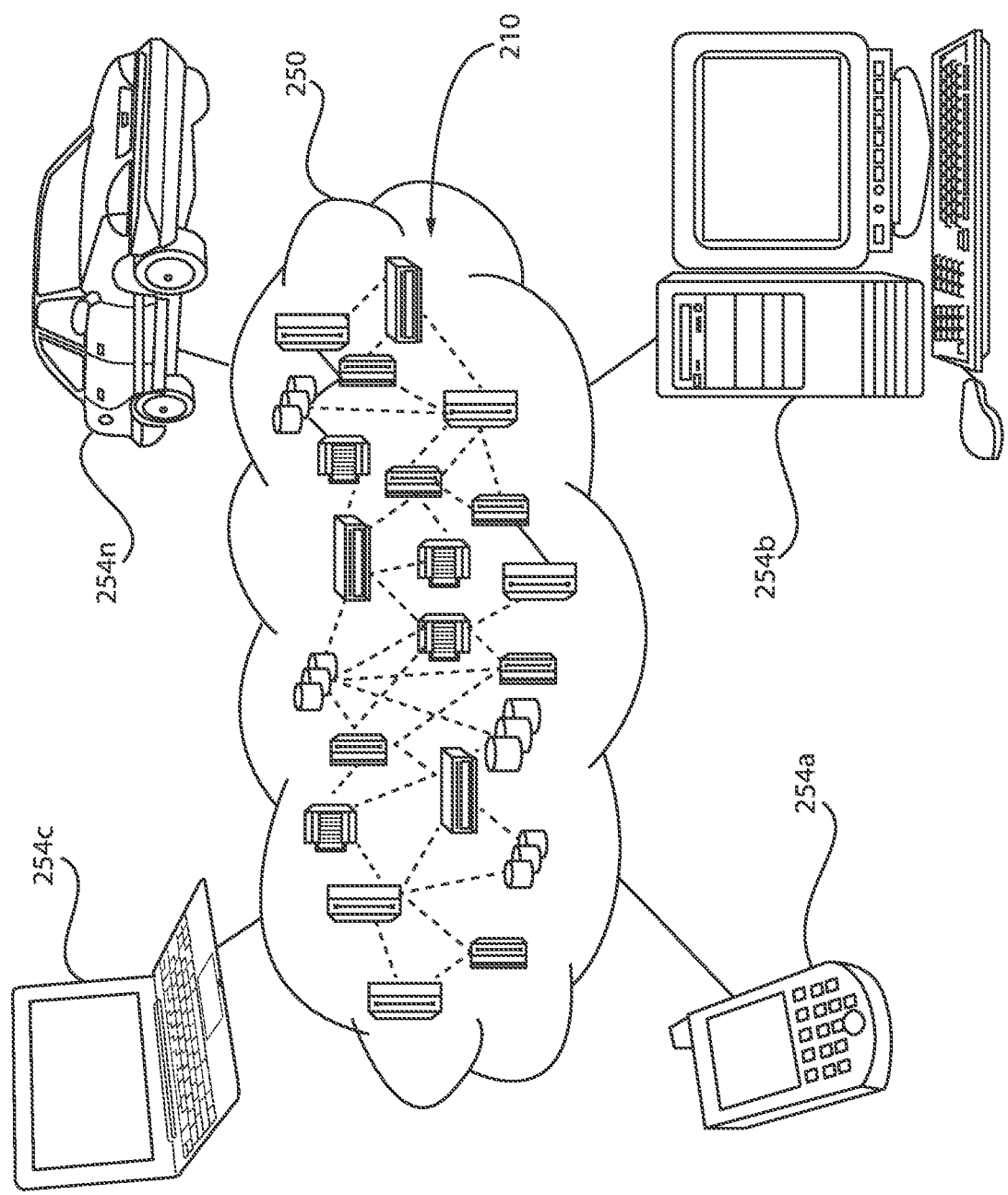
FIG. 2 is a block/flow diagram of an exemplary cloud computing environment, in accordance with an embodiment of the present invention.

FIG. 2 is a block/flow diagram of an exemplary cloud computing environment, in accordance with an embodiment of the present invention.

It is to be understood that although this invention includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 2, illustrative cloud computing environment 250 is depicted for enabling use cases of the present invention. As shown, cloud computing environment 250 includes one or more cloud computing nodes 210 with which local computing devices used by cloud consumers, such as, for example, personal digital assistant (PDA) or cellular telephone 254A, desktop computer 254B, laptop computer 254C, and/or automobile computer system 254N can communicate. Nodes 210 can communicate with one another. They can be grouped (not shown) physically or virtually, in one or more networks, such as Private, Community, Public, or Hybrid clouds as described hereinabove, or a combination thereof. This allows cloud computing environment 250 to offer infrastructure, platforms and/or software as services for which a cloud consumer does not need to maintain resources on a local computing device. It is understood that the types of computing devices 254A-N shown in FIG. 2 are intended to be illustrative only and that computing nodes 210 and cloud computing environment 250 can communicate with any type of computerized device over any type of network and/or network addressable connection (e.g., using a web browser).

Figure 3:
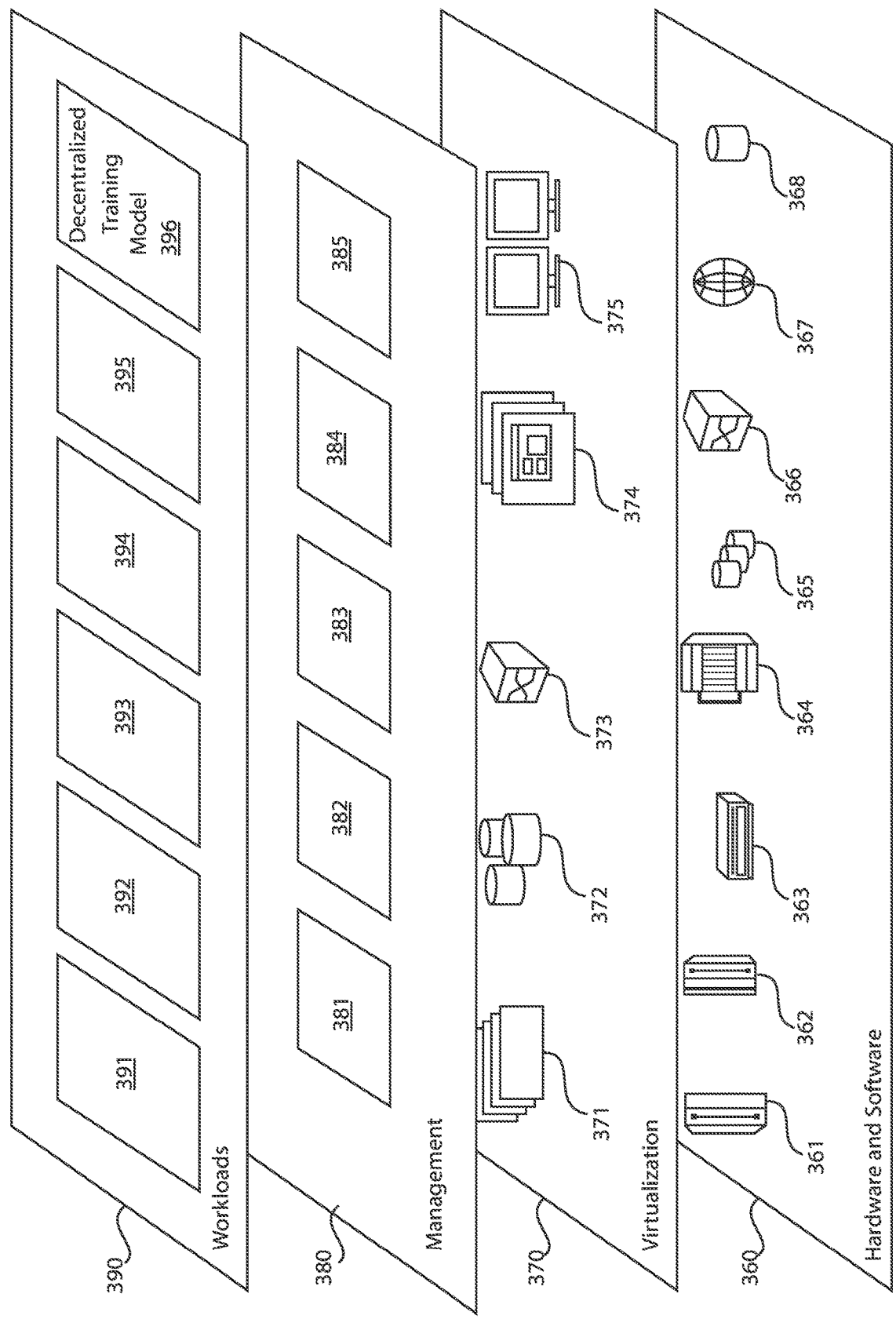
FIG. 3 is a schematic diagram of exemplary abstraction model layers, in accordance with an embodiment of the present invention.

FIG. 3 is a schematic diagram of exemplary abstraction model layers, in accordance with an embodiment of the present invention. It should be understood in advance that the components, layers, and functions shown in FIG. 3 are intended to be illustrative only and embodiments of the invention are not limited thereto. As depicted, the following layers and corresponding functions are provided:

Hardware and software layer 360 includes hardware and software components. Examples of hardware components include: mainframes 361; RISC (Reduced Instruction Set Computer) architecture based servers 362; servers 363; blade servers 364; storage devices 365; and networks and networking components 366. In some embodiments, software components include network application server software 367 and database software 368.

Virtualization layer 370 provides an abstraction layer from which the following examples of virtual entities can be provided: virtual servers 371; virtual storage 372; virtual networks 373, including virtual private networks; virtual applications and operating systems 374; and virtual clients 375.

In one example, management layer 380 can provide the functions described below. Resource provisioning 381 provides dynamic procurement of computing resources and other resources that are utilized to perform tasks within the cloud computing environment. Metering and Pricing 382 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 383 provides access to the cloud computing environment for consumers and system administrators. Service level management 384 provides cloud computing resource allocation and management such that required service levels are met. Service Level Agreement (SLA) planning and fulfillment 385 provide pre-arrangement for, and procurement of, cloud computing resources for which a future requirement is anticipated in accordance with an SLA.

Workloads layer 390 provides examples of functionality for which the cloud computing environment can be utilized. Examples of workloads and functions which can be provided from this layer include: mapping and navigation 391; software development and lifecycle management 392; virtual classroom education delivery 393; data analytics processing 394; transaction processing 395; and a decentralized training module 396 in cloud servers.

Figure 4:
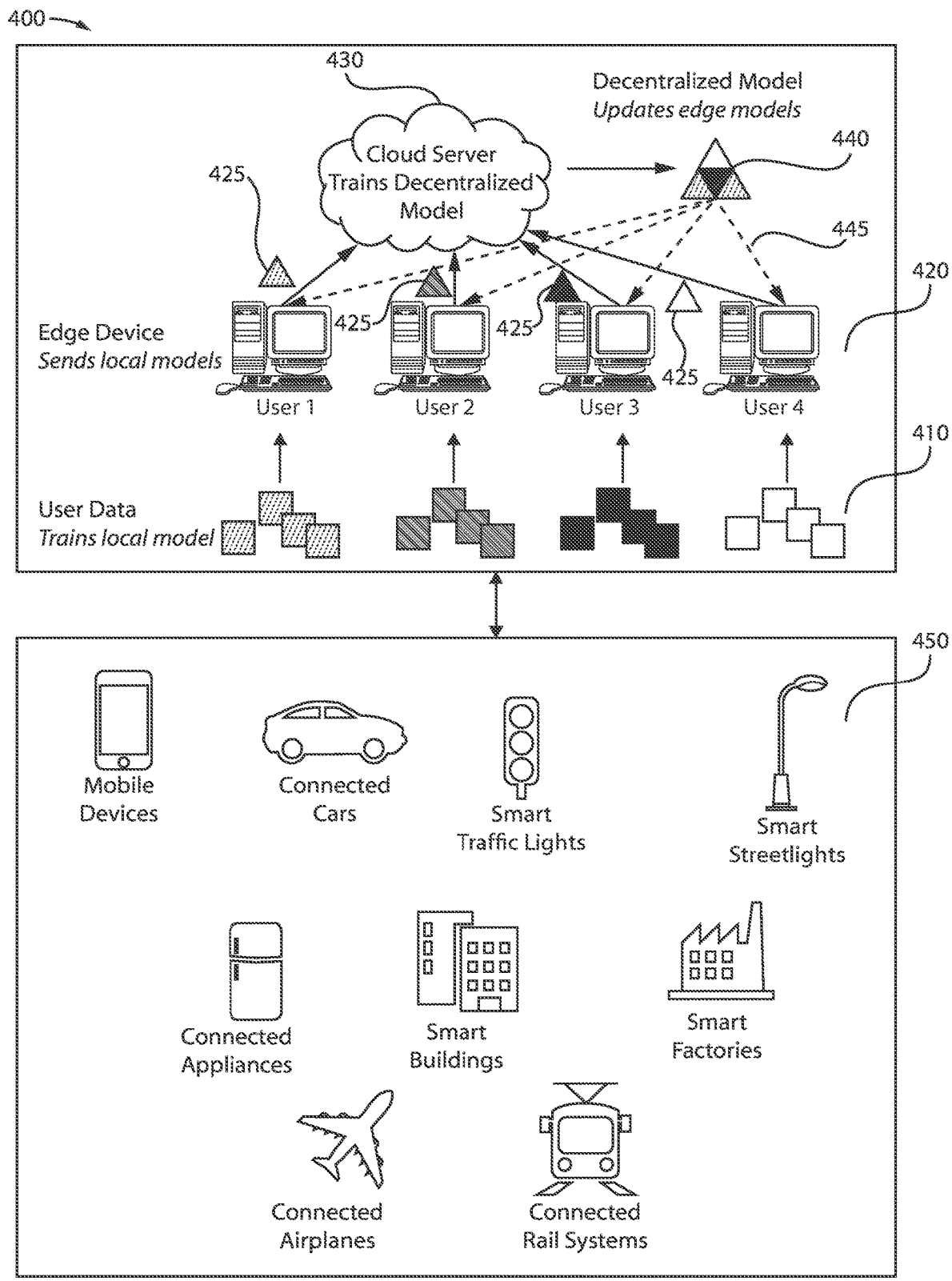
FIG. 4 is a block/flow diagram of an example decentralized training model where the trained networks are merged into a single artificial intelligence (AI) model, in accordance with an embodiment of the present invention.

FIG. 4 is a block/flow diagram of an example decentralized training model where the trained networks are merged into a single artificial intelligence (AI) model, in accordance with an embodiment of the present invention.

The decentralized training model 400 includes user data 410 that is collected from a plurality of users 450. The user data 410 is collected by edge devices 420 (or computing instances 420). The edge devices 420 download a model and train the model based on the user data 410. The trained models 425 generated from each edge device 420 are sent to a cloud server 430. The cloud server 430 collects all of the trained models 425 and merges or combines the trained models 425 to create a single AI model 440 that can then be deployed back (transmission 445) to the edge devices 420. The user data 410 can be collected from a plurality of different hardware devices 450 located in a plurality of different environments. The hardware devices 450 can be, e.g., mobile devices, connected automobiles, smart traffic lights, smart streetlights, connected appliance, smart buildings, smart factories, connected airplanes, connected rail systems, etc. This is not meant to be an exhaustive list of hardware devices.

In other words, in one example, a model can be located on one or more clouds (or cloud instances). The model needs to be trained. The training data does not exist on the one or more clouds. The training data exists on hardware devices or computing instances. In one example, the training data exists on edge devices (or computing instances that can train their own private classifier). An edge device is a device which provides an entry point into enterprise or service provider core networks. Examples include routers, routing switches, integrated access devices (IADs), multiplexers, and a variety of metropolitan area network (MAN) and wide area network (WAN) access devices. Edge devices control data flow at the boundary between two networks. Each edge device can download the model from the cloud. Each edge device updates the model based on the data found on the device. The data is user data compiled over a period of time. Once the model has been updated by an edge device based on its own data, only the trained model is sent back to the cloud. The cloud thus collects all of the updated models. The cloud does not collect the training data, only the updated trained models. All of the updated trained models are merged or combined to create a single AI model. This single AI model can then be re-deployed to each of the edge devices so that each edge device runs an averaged updated trained model. The merged training model includes data from a plurality of different edge devices that can include different classifier architectures.

Therefore, the exemplary embodiments of the present invention train small, individual networks at the edge with user-specific data, and then only the trained networks are sent to the cloud, without the confidential data. The exemplary embodiments can merge the trained networks into a single artificial intelligence (AI) model that can then be re-deployed to the edge devices. In this way, user specificity and privacy are preserved, and each user can benefit from the enhanced network capabilities provided by the crowd-sourcing of training data (without sending the training data itself to the cloud).

The exemplary embodiments further address the scenario of federated learning to average together classifiers (image, audio, text, etc.) trained on the edge with user data. However, conventional federated learning techniques are only applicable to models that share exactly the same structure and classes. Generally, it is not possible for such conventional methods to merge together models with different internal structure/target classes. In contrast, the exemplary embodiments of the present invention, allow users to define their own customized target classes. These classes do not need to be defined in all individual user classifiers. Therefore, other approaches involve, for example, combining many classifiers in a hierarchical fashion. However, this conventional approach is not scalable as the number of classifiers increases. In contrast, the exemplary embodiments of the present invention can process classifiers with different target classes.

Figure 5:
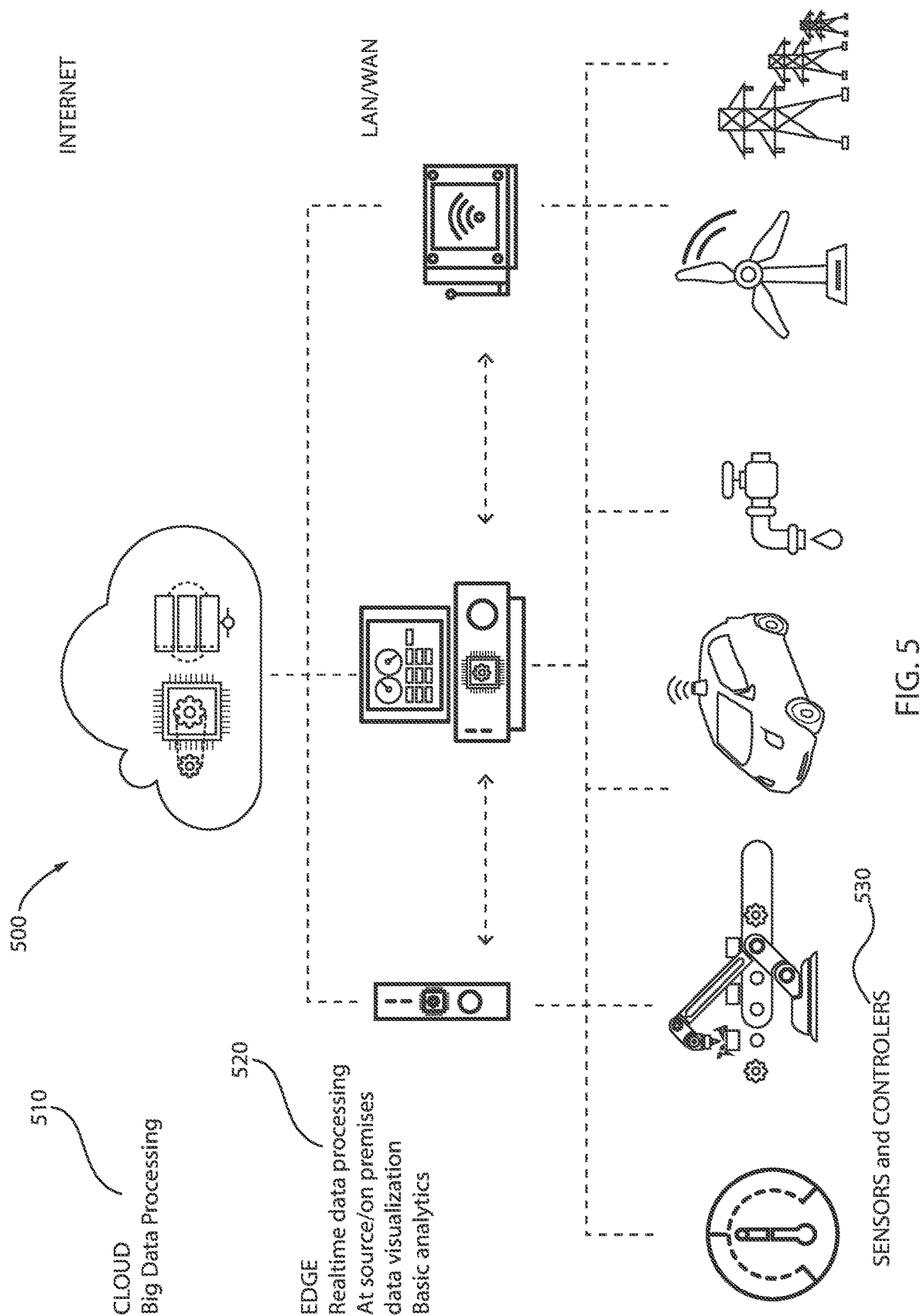
FIG. 5 is a block/flow diagram of an example edge computing architecture, in accordance with an embodiment of the present invention.

FIG. 5 is a block/flow diagram of an example edge computing architecture 500, in accordance with an embodiment of the present invention.

Sensors and controllers 530 from various hardware devices collect data that is transmitted to the edge devices 520. This is real-time data processing. The edge devices 520 can transmit selective information to the cloud 510.

Edge computing complements the cloud to create an overall IoT solution. Edge computing is a distributed information technology (IT) architecture in which client data is processed at the periphery of the network, as close to the originating source as possible. The move toward edge computing is driven by mobile computing, the decreasing cost of computer components and the sheer number of networked devices in the Internet of Things (IoT). Depending on the implementation, time-sensitive data in an edge computing architecture can be processed at the point of origin by an intelligent device or sent to an intermediary server located in close geographical proximity to the client. Data that is less time sensitive is sent to the cloud for historical analysis, big data analytics and long-term storage.

Transmitting massive amounts of raw data over a network puts tremendous load on network resources. In some cases, it is much more efficient to process data near its source and send only the data that has value over the network to a remote data center. Instead of continually broadcasting data about the oil level in a car's engine, for example, an automotive sensor might simply send summary data to a remote server on a periodic basis. Or a smart thermostat might only transmit data if the temperature rises or falls outside acceptable limits. Or an intelligent Wi-Fi security camera aimed at an elevator door might use edge analytics and only transmit data when a certain percentage of pixels significantly change between two consecutive images, indicating motion. In the instant case, only trained models (not the training data) are sent back to the cloud from the edge devices that collected the user-specific data. The user-specific data on each edge device is employed to create the training models. The user-specific data can be from multiple users per edge device.

The benefits of employing edge computing to deliver only trained models to the cloud to create a single AI by employing a generative adversarial network are, e.g., Faster response time: Power of data storage and computation is distributed and local. No roundtrip to the cloud reduces latency and empowers faster responses. This will help stop critical machine operations from breaking down or hazardous incidents from taking place.

Reliable operations when intermittent connectivity: For most remote assets, monitoring or unreliable internet connectivity regions such as oil wells, farm pumps, solar farms or windmills can be difficult. Edge devices' ability to locally store and process data ensures no data loss or operational failure in the event of limited internet connectivity.

Security and compliance: Due to edge computing's technology, a lot of data transfer between devices and cloud is avoidable. It's possible to filter sensitive information locally and only transmit important data model building information to the cloud. This allows users to build an adequate security and compliance framework for enterprise security and audits.

Cost-effective solutions: One of the practical concerns around IoT adoption is the upfront cost due to network bandwidth, data storage, and computational power. Edge computing can locally perform a lot of data computations, which allows customers to decide which services to run locally and which ones to send to the cloud, which reduces the final costs of an overall IT solution.

Figure 6:
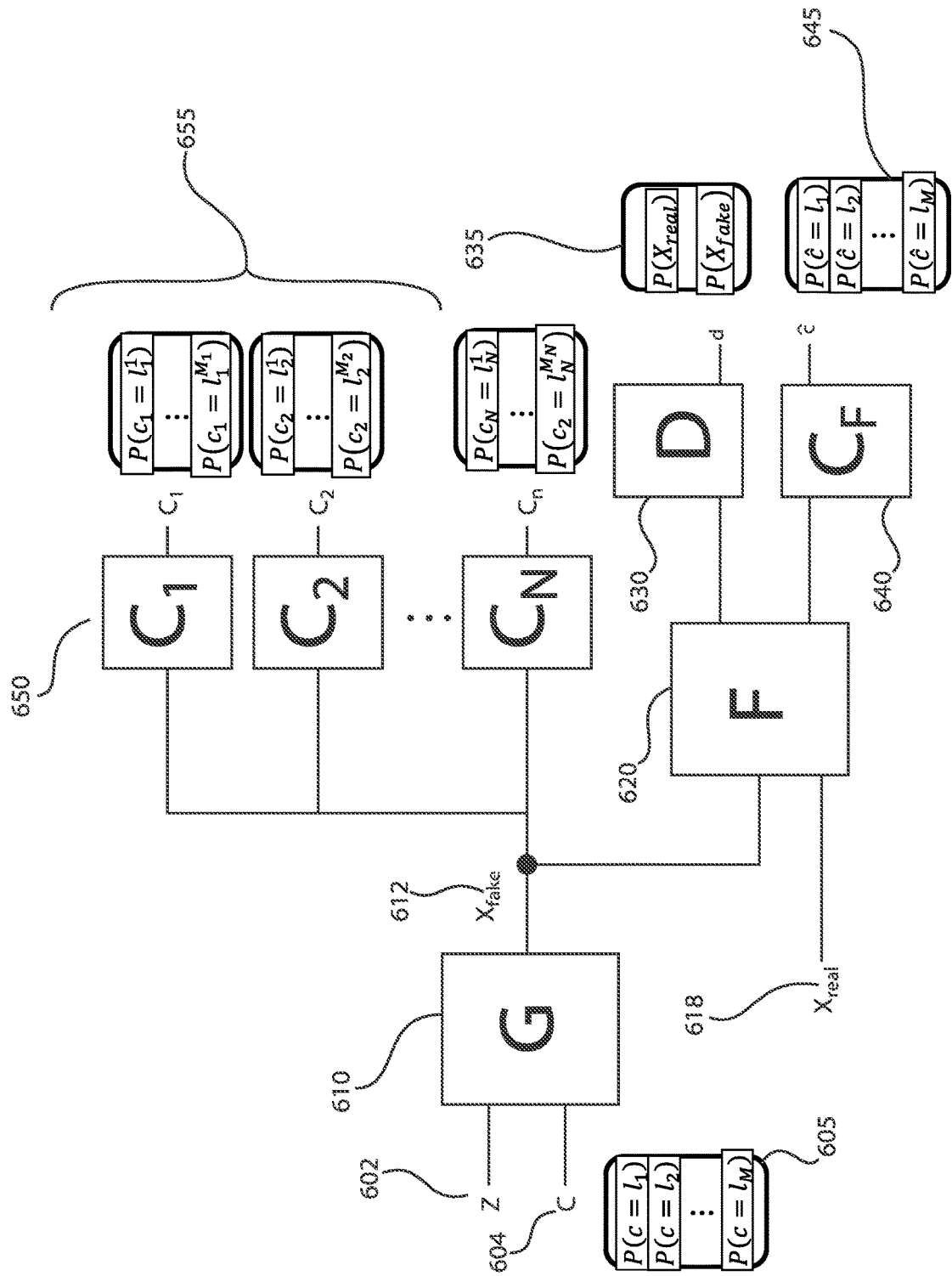
FIG. 6 is a block/flow diagram illustrating an example generative adversarial training procedure that jointly trains an image generator and a classification network, in accordance with an embodiment of the present invention.

FIG. 6 is a block/flow diagram illustrating an example generative adversarial training procedure that jointly trains an image generator and a classification network, in accordance with an embodiment of the present invention.

The exemplary embodiments of the present invention cast the scenario as a generative problem:

Given a set of N classifiers $\mathcal{C} = \{C_1, C_2, \ldots, C_N\}$ where each $C_i$ is trained at the edge with data from a probability distribution $P_i$, a generator network G is trained that captures the joint probability distribution $$P = \frac{1}{N}\Sigma_{i=1}^{N} P_i.$$

The result is that the generator G can then be used to generate unlimited samples of images from P that can be used to train a federated network $C_F$ on the cloud.

Generated images reflect the characteristics of user data without explicit exchange of private user content.

This process allows networks in $\mathcal{C}$ to have arbitrary structures and target classes.

The following variables or parameters are defined as follows:

$\mathcal{C} = \{C_1, C_2, \ldots, C_N\}$ be a set of N edge-trained classifiers.

$\mathcal{L} = \{0, 1, \ldots, M-1\} \subseteq \mathbb{Z}^+$ be the set of all labels.

$L_n = \{1_n^1, 1_n^2, \ldots, 1_n^{M_n}\} \subseteq \mathcal{L}$ be the set of labels that $C_n$ can classify.

$z \in \mathbb{R}^{d_z}$ be a noise seed vector.

$c \in [0,1]^M$ be a probability vector over M classes.

$X_{real} \subset [0,1]^{s \times s}$ be a set of unlabeled generic images.

$G: \mathbb{R}^{d_z} \times [0,1]^M \to [0,1]^{s \times s}$ be an image generator.

$F: [0,1] \to \mathbb{R}^l$ be a feature extractor.

$D: \mathbb{R}^l \to [0,1]$ be a real/fake image discriminator.

$C_F: \mathbb{R}^l \to [0,1]^M$ be a classifier that can classify all M classes.

$\ell$ is a loss function (e.g. cross entropy).

The exemplary embodiments propose a generative adversarial training procedure between G and D that jointly trains an image generator G to synthesize realistic image samples according to the union of user-defined labels in $\mathcal{L}$, and a classification network including a feature extractor F and a classifier $C_F$ that can classify all classes in $\mathcal{L}$.

The exemplary network can therefore produce a classifier (F, $C_F$) that incorporates all the information from the individual $C_n$ without having explicit access to the labeled data. The exemplary network (F, $C_F$) can then be deployed back to the edge for inference/additional training.

The exemplary network is trained in an adversarial fashion. Specifically, the algorithm alternately minimizes the following cost functions 810, 820 (FIG. 8):

$$L^{DF}(\theta_F,\theta_D,\theta_{C_F},\theta_G) = \lambda_1 \Sigma_{z \sim \mathcal{N}(\mu;\sigma^2), l \sim multi(M)} \ell$$
$$(D(F(G(z,e_l;\theta_G);\theta_F);\theta_D),0) + \lambda_2 \Sigma_{I \in X_{real}} \ell (D(F(I;$$
$$\theta_F);\theta_D),1) + \lambda_3 \Sigma_{z \sim \mathcal{N}(\mu;\sigma^2), l \sim multi(M)} \ell (C_F(F(G(z,e_l;\theta_G);\theta_F);\theta_{C_F}),l)$$

$$L^G(\theta_F,\theta_D,\theta_G) = \Sigma_{z \sim \mathcal{N}(\mu;\sigma^2), l \sim multi(M)} [-\lambda_4 \ell (D$$
$$(F(G(z,e_l;\theta_G);\theta_F);\theta_D),0) + \lambda_5 \Sigma_{n:l \in L_n} \ell (C_n(G(z,e_l;\theta_G));l)]$$

Where θ are model parameters (weights) of each respective component, λ are hyperparameters used for balancing terms in the cost functions, μ is a mean deviation of the normal distribution used for sampling vector z, σ is a standard deviation of the normal distribution used for sampling vector z (usually set to a vector of zeroes and a vector of ones, respectively), D is the discriminator model, G is the generator model, F is the feature extractor, $e_l$ is a one-hot vector for label l, l is the loss function, z is a noise seed function, $C_F$ is the federated classifier, $C_n$ is an edge trained classifier, and I is a real image sampled from a set of real images ($X_{real}$).

Regarding the training procedure:

The exemplary methods set $\lambda_1 = \lambda_2 = \lambda_3 = \lambda_5 = 1$ and $\lambda_4 = 10$.

The training is performed in mini-batch with, e.g., an Adam optimizer. Adaptive moment estimation (Adam) is an optimization algorithm that can used instead of the classical stochastic gradient descent procedure to update network weights iterative based in training data.

When minimizing $L^G$, for each mini-batch, the exemplary methods normalize $\Sigma_{n:l \in L_n} \mathcal{L}(C_n(G(z,e_l;\theta_G));l)$ by dividing it with the number of images with the same label l in that mini-batch.

The generative adversarial training procedure of FIG. 6 illustrates a generator model 610 that received inputs 602 (Z) and 604 (C). Inputs 604 can be latent variables or class variables, whereas input 602 can be noise. The generator model 610 is pitted against the discriminator model 630. The discriminator model 630 learns to determine whether a sample is from the model distribution or the data distribution. The feature extractor 620 can build derived values (features) intended to be informative and non-redundant, whereas the classifier 640 can classify all classes in $\ell$. The feature extractor 620 can receive fake images 612 ($X_{fake}$) and real images 618 ($X_{real}$). The fake images 612 are also fed into the set of N edge-trained classifiers 650. It is noted that the fake images 612 are generated from the generator model 610. The output 635 of the discriminator model 630 is a probability that the image is real and a probability that the image is fake.

The classifier 640 is a federated classifier derived from federated learning. Standard machine learning approaches require centralizing the training data on one machine or in a datacenter. However, for models trained from user interaction with mobile devices, an additional approach exists and is referred to as federated learning. Federated learning enables mobile phones to collaboratively learn a shared prediction model while keeping all the training data on the device, decoupling the ability to do machine learning from the need to store the data in the cloud. This goes beyond the use of local models that make predictions on mobile devices by bringing model training to the device as well.

Federated learning can work as follows: a device downloads the current model, improves it by learning from data on a user's phone, and then summarizes the changes as a small focused update. Only this update to the model is sent to the cloud, using encrypted communication, where it is immediately averaged with other user updates to improve the shared model. All the training data remains on the user's device, and no individual updates are stored in the cloud. Federated learning allows for smarter models, lower latency, and less power consumption, all while ensuring privacy. And this approach has another immediate benefit, that is, in addition to providing an update to the shared model, the improved model on the user's phone can also be used immediately, powering experiences personalized by the way the user uses the phone or device. However, this federated learning approach is only applicable to models that share exactly the same structure and classes.

The exemplary embodiments of the present invention take this federated learning approach a step further by training the networks at the edge with user-specific data and only the trained networks or trained models are sent to the cloud (not the training data). Then the trained networks can be merged or combined into a single AI that can be deployed to the edge devices. This is accomplished by employing a generative adversarial training procedure between a generator model and a discriminator model to jointly or concurrently or simultaneously train an image generator with a classification network.

In the exemplary embodiments of the present invention, the scenario is cast as a generative problem. For example, given a set of N classifiers $\{C\_1, \ldots, C\_N\}$ 650, where each $C\_i$ is trained at the edge with images from a probability distribution $P\_i$ (655), the methods aim to train a synthetic image generator G (610) which can generate images from the joint probability distribution P (605), where P is the union of all $\{P\_1, \ldots, P\_N\}$ (655). In this way, the generator G can then be used to generate unlimited samples of images from P which exhibit similar characteristic to the user data, without the data being explicitly exchanged. The generated data can then be employed to train a federated network $C\_F$ (640) on the cloud, which is able to classify (645) the union of the target classes from $\{C\_1, \ldots, C\_N\}$ (650).

Therefore, the exemplary embodiments introduce a generative adversarial training procedure involving an image generator G, an image discriminator D that can distinguish real images from generated images and a classifier $C\_F$. The exemplary embodiments also assume the availability of a database of unlabeled real images U. By the end of the training procedure, the image generator G is able to synthesize realistic image samples according to the target classes of the edge-trained networks. The classifier uses the data generated by G to learn to classify the union of the target classes from the edge-trained networks with realistic data.

The generative adversarial training procedure of FIG. 6 employs a generative adversarial network. Generative adversarial networks (GANs) include two models, that is, a generator model and a discriminator model. The discriminator model operates like a normal binary classifier that is able to classify images into different categories. The discriminator model determines whether an image is real and from a given dataset or is artificially generated. The discriminator model tries to predict certain classes given certain features. The generator model tries to predict features given classes. This involves determining the probability of a feature given a class. Thus, a generator generates new instances of an object while the discriminator determines whether the new instance belongs to the actual dataset.

Figure 7:
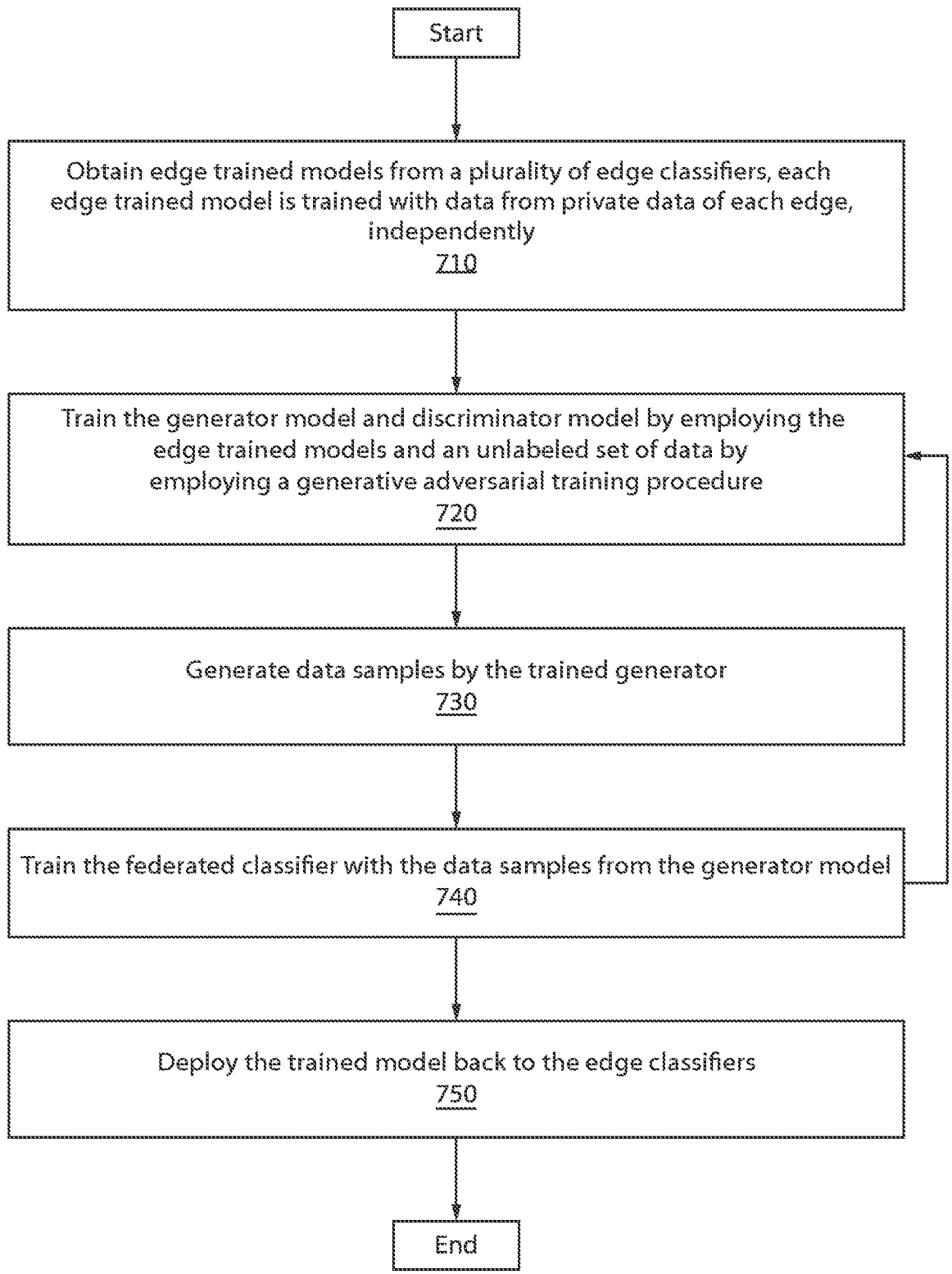
FIG. 7 is a block/flow diagram illustrating an example method for executing the generative adversarial training procedure that jointly trains the image generator and the classification network, in accordance with an embodiment of the present invention.

FIG. 7 is a block/flow diagram illustrating an example method for executing the generative adversarial training procedure that jointly trains the image generator and the classification network, in accordance with an embodiment of the present invention.

At block 710, obtain edge trained models from a plurality of edge classifiers, each edge trained model being trained with data from private data of each edge, independently.

At block 720, train the generator using the edge trained models.

At block 730, generate data samples by the trained generator.

At block 740, train the federated classifier with the data samples using a generative adversarial training procedure between the generator and the discriminator to construct the trained model.

At block 750, deploy the trained model back to the plurality of edge classifiers or devices.

In summary, the exemplary embodiments of the present invention employ an unsupervised learning method without training data being sent to the cloud server. The exemplary embodiments thus merge together already trained models without any exchange of training data. Stated differently, the exemplary embodiments merge already trained models into a single model that encapsulates all the functionalities of the merged models, which is executed in an unsupervised fashion without any exchange of training data (between the edge devices and the cloud server). Therefore, different (or arbitrary) models with different (or arbitrary) architectures can be merged or combined in a single model without explicit data exchange.

Moreover, in summary, the exemplary embodiments of the present invention train a single federated classifier from multiple pre-trained classifiers, where each was trained to classify different target classes. A generative-adversarial-based cost function employs supervision from the pre-trained classifiers to train a generator model. This generator model, together with a random probability vector over all target classes, is then employed to generate sample data to train the desired federated classifier.

As used herein, the terms "data," "content," "information" and similar terms can be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data can be received directly from the another computing device or can be received indirectly via one or more intermediary computing devices, such as, for example, one or more servers, relays, routers, network access points, base stations, and/or the like. Similarly, where a computing device is described herein to send data to another computing device, the data can be sent directly to the another computing device or can be sent indirectly via one or more intermediary computing devices, such as, for example, one or more servers, relays, routers, network access points, base stations, and/or the like.

As used herein, the terms "network connection," and "connection" refer to communication sessions with a semi-permanent connection for interactive packet interchange between two or more communicating endpoints, such as network devices. The connection can be established before application data is transferred, and where a stream of data is delivered in the same or different order than it was sent. The alternative to connection-oriented transmission is connectionless communication. For example, the datagram mode of communication used by the Internet Protocol (IP) and the Universal Datagram Protocol (UDP) can deliver packets out of order, since different packets can be routed independently and could be delivered over different paths.

As used herein, the terms "session flow" and "network flow" refer to one or more network packets or a stream of network packets that are communicated in a session that is established between at least two endpoints, such as two network devices. In at least one of the various embodiments, flows can be useful if one or more of the endpoints of a session can be behind a network traffic management device, such as a firewall, switch, router, load balancer, or the like.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to at least one processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks or modules.

The computer readable program instructions can also be loaded onto a computer, other programmable data processing apparatus, or other device to cause a series of operational blocks/steps to be performed on the computer, other programmable apparatus or other device to produce a computer implemented process, such that the instructions which execute on the computer, other programmable apparatus, or other device implement the functions/acts specified in the flowchart and/or block diagram block or blocks or modules.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This can be extended, as readily apparent by one of ordinary skill in this and related arts, for as many items listed.

Having described preferred embodiments of a system and method for constructing a trained model for a plurality of edge classifiers in a network having a federated classifier, a generator, and a discriminator (which are intended to be illustrative and not limiting), it is noted that modifications and variations can be made by persons skilled in the art in light of the above teachings. It is therefore to be understood that changes may be made in the particular embodiments described which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer implemented method executed on a processor for constructing a trained model for a plurality of edge devices in a network having a federated classifier, a generator model, and a discriminator model, the method comprising:

obtaining edge trained models from the plurality of edge devices, each edge trained model being trained independently with data from private data of each edge;

training the generator model and discriminator model by employing the edge trained models and an unlabeled set of data by employing a generative adversarial training procedure;

generating data samples by the trained generator model;

training the federated classifier with the data samples from the generator model;

merging the edge trained models at a cloud server to construct a single trained model; and deploying the single trained model back to the plurality of edge devices without the private data of each edge.

2. The method of claim 1, wherein the edge trained models include different structures and different target classes.

3. The method of claim 1, wherein the network produces the federated classifier without having explicit access to labeled data.

4. The method of claim 1, wherein the generative adversarial training procedure between the generator model and the discriminator model involves alternately minimizing a first cost function and a second cost function.

5. The method of claim 4, wherein the first cost function is $$L^{DF}(\theta_F,\theta_D,\theta_{C_F},\theta_G) = \lambda_1 \Sigma_{z \sim \mathcal{N}(\mu;\sigma^2), l \sim multi(M)} \ell(D(F(G(z,e_l;\theta_G);\theta_F);\theta_D),0) + \lambda_2 \Sigma_{l \in Y} \ell(D(F(I;\theta_F);\theta_D),1) + \lambda_3 \Sigma_{z \sim \mathcal{N}(\mu;\sigma^2), l \sim multi(M)} \ell(C_F(F(G(z,e_l;\theta_G);\theta_F);\theta_{C_F}),l)$$

and the second cost function is $$L^G(\theta_F,\theta_D,\theta_G) = \Sigma_{z \sim \mathcal{N}(\mu;\sigma^2), l \sim multi(M)} [-\lambda_4 \ell(D(F(G(z,e_l;\theta_G);\theta_F);\theta_D),0) + \lambda_5 \Sigma_{n:l \in L_n} \ell(C_n(G(z,e_l;\theta_G);l)],$$

where $\theta$ are model parameters of each respective component, $\lambda$ are hyperparameters used for balancing terms in the cost functions, $\mu$ is a mean deviation of the normal distribution used for sampling vector z, $\sigma$ is a standard deviation of the normal distribution used for sampling vector z, D is the discriminator model, G is the generator model, F is the feature extractor, $e_l$ is a one-hot vector for label l, l is the loss function, z is a noise seed function, $C_F$ is the federated classifier, $C_n$ is an edge trained classifier, and I is a real image sampled from a set of real images.

6. The method of claim 1, wherein the method is executed in an unsupervised fashion without any exchange of training data between the cloud server and the plurality of edge devices.

7. A non-transitory computer-readable storage medium comprising a computer-readable program executed on a processor in a data processing system for constructing a trained model for a plurality of edge devices in a network having a federated classifier, a generator model, and a discriminator model, wherein the computer-readable program when executed on the processor causes a computer to perform the steps of:

obtaining edge trained models from the plurality of edge devices, each edge trained model being trained independently with data from private data of each edge;

training the generator model and discriminator model by employing the edge trained models and an unlabeled set of data by employing a generative adversarial training procedure;

generating data samples by the trained generator model;

training the federated classifier with the data samples from the generator model;

merging the edge trained models at a cloud server to construct a single trained model; and deploying the single trained model back to the plurality of edge devices without the private data of each edge.

8. The non-transitory computer-readable storage medium of claim 7, wherein the edge trained models include different structures and different target classes.

9. The non-transitory computer-readable storage medium of claim 7, wherein the network produces the federated classifier without having explicit access to labeled data.

10. The non-transitory computer-readable storage medium of claim 7, wherein the generative adversarial training procedure between the generator model and the discriminator model involves alternately minimizing a first cost function and a second cost function.

11. The non-transitory computer-readable storage medium of claim 10, wherein the first cost function is $$L^{DF}(\theta_F,\theta_D,\theta_{C_F},\theta_G) = \lambda_1 \sum_{z\sim\mathcal{N}(\mu;\sigma^2), l\sim multi(M)} \ell(D(F(G(z,e_l;\theta_G);\theta_F);\theta_D),0) + \lambda_2 \Sigma_{l\in Y} \ell(D(F(I;\theta_F);\theta_D),1) + \lambda_3 \sum_{z\sim\mathcal{N}(\mu;\sigma^2), l\sim multi(M)} \ell(C_F(F(G(z,e_l;\theta_G);\theta_F);\theta_{C_F}),l)$$

and the second cost function is $$L^G(\theta_F,\theta_D,\theta_G) = \sum_{z\sim\mathcal{N}(\mu;\sigma^2), l\sim multi(M)} [-\lambda_4 \ell(D(F(G(z,e_l;\theta_G);\theta_F);\theta_D),0) + \lambda_5 \Sigma_{n:l\in L_n} \ell(C_n(G(z,e_l;\theta_G));l)],$$

, where $\theta$ are model parameters of each respective component, $\lambda$ are hyperparameters used for balancing terms in the cost functions, $\mu$ is a mean deviation of the normal distribution used for sampling vector z, $\sigma$ is a standard deviation of the normal distribution used for sampling vector z, D is the discriminator model, G is the generator model, F is the feature extractor, $e_l$ is a one-hot vector for label l, l is the loss function, z is a noise seed function, $C_F$ is the federated classifier, $C_n$ is an edge trained classifier, and I is a real image sampled from a set of real images.

12. The non-transitory computer-readable storage medium of claim 7, wherein a learning method is executed in an unsupervised fashion without any exchange of training data between the cloud server and the plurality of edge devices.

13. A system for constructing a trained model, the system comprising:

a plurality of edge devices in a network having a federated classifier, a generator model, and a discriminator model configured to:

obtain edge trained models from the plurality of edge devices, each edge trained model being trained independently with data from private data of each edge;

train the generator model and discriminator model by employing the edge trained models and an unlabeled set of data by employing a generative adversarial training procedure;

generate data samples by the trained generator model;

train the federated classifier with the data samples from the generator model;

merge the edge trained models at a cloud server to construct a single trained model; and deploy the single trained model back to the plurality of edge devices without the private data of each edge.

14. The system of claim 13, wherein the edge trained models include different structures and different target classes.

15. The system of claim 13, wherein the network produces the federated classifier without having explicit access to labeled data.

16. The system of claim 13, wherein the generative adversarial training procedure between the generator model and the discriminator model involves alternately minimizing a first cost function and a second cost function.

17. The system of claim 16, wherein the first cost function is $$L^{DF}(\theta_F,\theta_D,\theta_{C_F},\theta_G) = \lambda_1 \sum_{z\sim\mathcal{N}(\mu;\sigma^2), l\sim multi(M)} \ell(D(F(G(z,e_l;\theta_G);\theta_F);\theta_D),0) + \lambda_2 \Sigma_{l\in Y} \ell(D(F(I;\theta_F);\theta_D),1) + \lambda_3 \sum_{z\sim\mathcal{N}(\mu;\sigma^2), l\sim multi(M)} \ell(C_F(F(G(z,e_l;\theta_G);\theta_F);\theta_{C_F}),l)$$

and the second cost function is $$L^G(\theta_F,\theta_D,\theta_G) = \sum_{z\sim\mathcal{N}(\mu;\sigma^2), l\sim multi(M)} [-\lambda_4 \ell(D(F(G(z,e_l;\theta_G);\theta_F);\theta_D),0) + \lambda_5 \Sigma_{n:l\in L_n} \ell(C_n(G(z,e_l;\theta_G));l)],$$

where $\theta$ are model parameters of each respective component, $\lambda$ are hyperparameters used for balancing terms in the cost functions, $\mu$ is a mean deviation of the normal distribution used for sampling vector z, $\sigma$ is a standard deviation of the normal distribution used for sampling vector z, D is the discriminator model, G is the generator model, F is the feature extractor, $e_l$ is a one-hot vector for label l, l is the loss function, z is a noise seed function, $C_F$ is the federated classifier, $C_n$ is an edge trained classifier, and I is a real image sampled from a set of real images.

18. The system of claim 13, wherein a learning method is executed in an unsupervised fashion without any exchange of training data between the cloud server and the plurality of edge devices.

* * * * *